United States Patent

Kometani et al.

[11] Patent Number: 5,720,790
[45] Date of Patent: Feb. 24, 1998

[54] FILTER ELEMENT

[75] Inventors: Kazuo Kometani, Toyota; Toshiaki Nakayama, Nishikamo-gun; Satoshi Inukai, Chita-gun; Takanari Takagaki, Nagoya; Hideo Kamo, Chiryu; Minoru Honda, Kariya, all of Japan

[73] Assignees: Denso Corporation; Toyoda Boshoku Corporation, both of Kariya, Japan

[21] Appl. No.: 773,051

[22] Filed: Dec. 24, 1996

[30] Foreign Application Priority Data

Dec. 26, 1995 [JP] Japan ................... 7-339541
Sep. 9, 1996 [JP] Japan ................... 8-237092

[51] Int. Cl.$^6$ ........................... B01D 29/07
[52] U.S. Cl. ................ 55/497; 55/502; 55/521; 55/527
[58] Field of Search .............. 55/495, 497, 498, 55/502, 503, 506, 507, 514, 527, 528; 210/445, 493.1, 493.5, 493.3; 428/281, 287

[56] References Cited

U.S. PATENT DOCUMENTS

| | | | |
|---|---|---|---|
| 3,413,780 | 12/1968 | Amlott et al. | 55/503 |
| 4,826,598 | 5/1989 | Cain | 55/503 |
| 4,865,803 | 9/1989 | Dillmann et al. | 55/503 |
| 4,983,452 | 1/1991 | Daimon et al. | 428/287 |
| 5,368,925 | 11/1994 | Hosokawa et al. | 428/281 |

FOREIGN PATENT DOCUMENTS

| | | |
|---|---|---|
| 0692294A1 | 1/1996 | European Pat. Off. . |
| 1367226 | 7/1972 | United Kingdom . |

*Primary Examiner*—Richard L. Chiesa
*Attorney, Agent, or Firm*—Nixon & Vanderhye P.C.

[57] ABSTRACT

A filter element made of nonwoven filter fabric includes a plurality of pleated portions and a flange portion formed integrally with the filter portion. The flange portion is formed by a pair of press-forming dies to have a thin and compressed connecting portion formed along the outer periphery of the filter portion, a thick and uncompressed seal portion formed along the outer periphery of the connecting portion and a thin and compressed protecting portion formed along the outer periphery of the seal portion.

14 Claims, 17 Drawing Sheets

FILTER ELEMENT

BACKGROUND OF THE INVENTION

1. Field of the Invention

The present invention relates to a filter element and a process for manufacturing the same for using in an air cleaner for an internal combustion engine of an automobile.

2. Description of Related Art

Conventionally, a filter element for using in an air cleaner for an engine of an automobile is composed of a filter portion of a wave sheet and a flange portion framing the filter portion. Further, the air cleaner includes two housing members (case and cap) which construct a housing when assembled to each other.

When the filter element is assembled into an air cleaner having upper and lower housings, the flange portion of the filter element is held between peripheral holding portions of the upper and lower housing.

In the conventional air cleaner, a separate rubber gasket (seal member) is attached to the flange portion of the filter element to seal the holding portions of the housings and the flange portion of the filter element, resulting in an increase in the number of parts of the air cleaner and the cost thereof. Further, the gasket must be removed every time the filter element is exchanged, thereby reducing the sealing performance.

If the flange portion of the filter element is directly inserted between each of the holding portions of the housing the air cleaner without the gasket does not work because of poor sealing performance.

Further, EP 0692294A1 proposes a filter element having an integral flange portion. However, if the flange portion is inserted, as a seal member, between the upper and lower parts of the air cleaner housing (or a cap and a case), the flange portion may deform under a high temperature because of the adhesive fiber included therein. Thus, when the filter element is re-assembled after cleaning, a clearance results between the flange portion and the parts of the air cleaner.

Particularly, as the thickness of the flange portion increases, the deformation increases.

SUMMARY OF THE INVENTION

In view of the foregoing problems of the prior art, it is an object of the present invention to provide an inexpensive filter element which has a simple structure and a high reliability, and a low cost and a process for manufacturing the same.

Another object of the present invention is to provide a filter element which has a reliable sealing performance while the number of parts is decreased.

Another object of the present invention is to provide a filter element which can provide a reliable seal performance without using a gasket made from a separate part.

A further object of the present invention is to provide a filter element having an integral seal portion of a high durability formed from the same filter material.

In accordance with the present invention, there is provided a filter element with a flange portion including a compressed-thin connecting portion, a thick seal portion and a compressed-thin protecting portion. The flange portion is made from the filter sheets around the filter portion. The seal portion is formed on the flange portion has a thick and soft wall, which is directly held between the holding portions of the upper and lower parts of an air cleaner housing. Therefore, a separate gasket is not necessary. Because the seal portion is formed between the compressed connecting portion and the compressed protecting portion, the seal portion is protected from deforming force.

According to a method of the present invention, a filter element is manufactured through the following steps: forming a plurality of pleated sheets of nonwoven fabric; supporting the central portion of the pleated sheets; and press-forming a portion other than the central portion of the pleated sheets. The press-forming step is composed of: inserting the pleated sheets between an upper die and a lower die, and pressing inner and outer peripheries of the flange portion by the dies, thereby forming an uncompressed seal portion between the inner and outer peripheries.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Preferred embodiments of the present invention are described hereinafter with reference to the accompanying drawings.

First embodiment of the present invention will be described.

Figure 1:
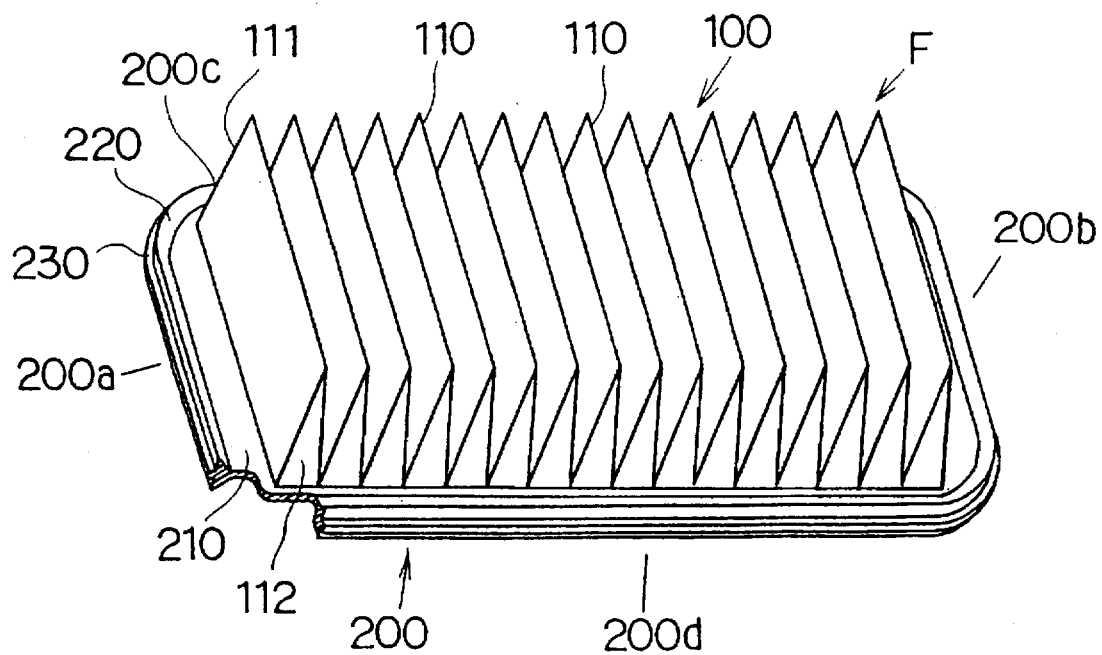
FIG. 1 is a perspective view showing a filter element according to a first embodiment of the present invention.

FIG. 1 shows a filter element F of the first embodiment used for an air cleaner for an internal combustion engine of an automobile.

Figure 2:
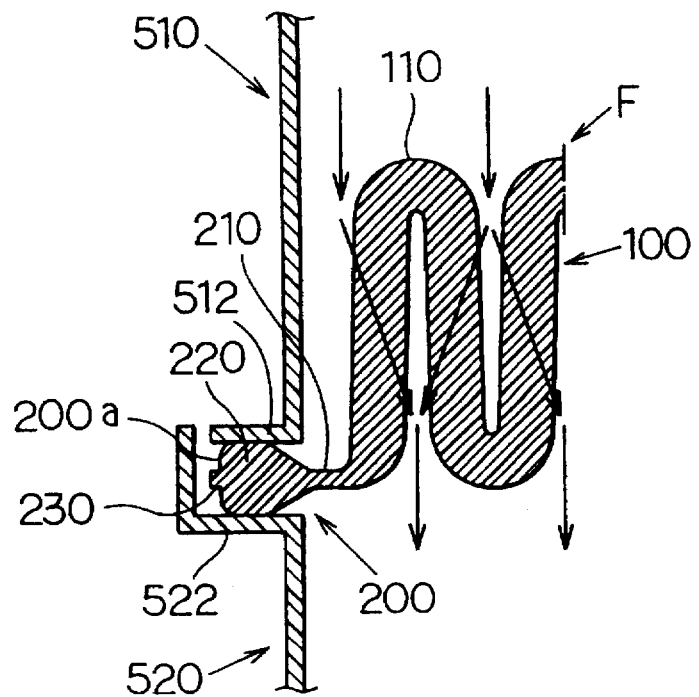
FIG. 2 is a partly enlarged sectional view showing the filter element held between holding portions of a filter housing case and a filter housing cap.
Figure 3A:
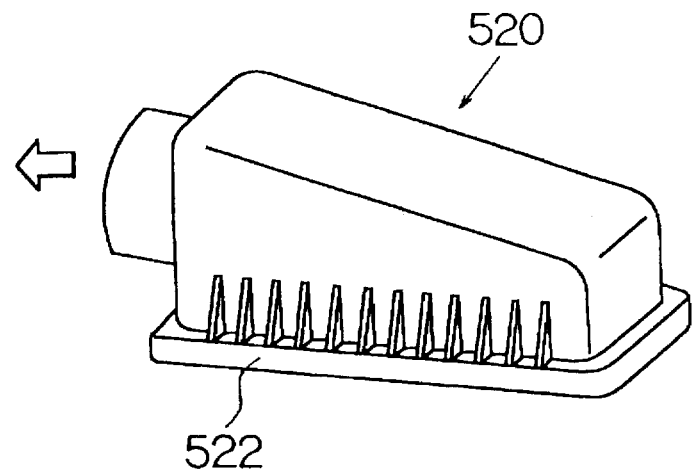
FIGS. 3A and 3B are perspective views respectively showing a clean-side housing cap and a dusty-side housing case of an air cleaner according to the first embodiment.
Figure 3B:
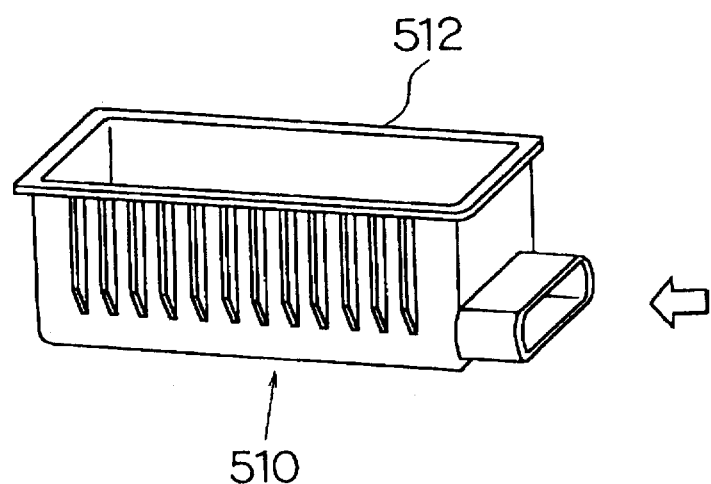

The filter element F is installed into a housing composed of a dusty side housing member 510 and a clean side housing member 520 so as to construct the air cleaner as shown in FIGS. 2 and 3.

This filter element F has a filter portion 100 of a wavy sheet and a flange portion 200 framing the filter portion 100. These filter portion 100 and flange portion 200 are made of the same nonwoven fabric of chemical fiber. Further, the nonwoven fabric is made by mixing main fiber and adhesive fiber. As the main fiber, polyester fiber is used and as the adhesive fiber, a modified polyester having a melting point (40° C. to 220° C., for example) lower than that of the polyester fiber (240° C., for example) of the main fiber is coated on the surface of the main fiber. The filter material is formed so that the fiber density becomes lower toward the upstream and higher toward the downstream at the flow direction of air.

The filter portion 100 is composed of a plurality of pleated portions 110 disposed in parallel with each other. Each of the pleated portions 110 projects forward from the flange portion 200 to a side to provide a sufficient filtering area of the filter portion 100. Surfaces 111 and 112 of opposite sides of the pleated portion 110 are closed.

The flange portion 200 surrounds four sides of the rectangular outer periphery of the filter portion 100. The flange portion 200 includes a circular (in the sense that it completely encompasses the filter) connecting portion 210, a circular (in the same sense that it encircles or encompasses the filter) seal portion 220 formed along the outer periphery of this circular connecting portion 210, and a corded protecting portion 230 formed along the outer periphery of this seal portion 220.

A plurality of layers of the filter material is folded at the opposite end portions 200a and 200b of the flange portion 200. On the other hand, a plurality of layers of the filter material is pressed at two side portions 200c and 200d from upper side at the same pitch as the waves or pleats of the filter portion 100.

When the flange portion 200 is formed by pressing the filter material at a high temperature, main fiber of the filter material of the connecting portion 210 and the protecting portion 230 are heated and deformed into a thin and compressed (or solid) resinous sheet.

On the other hand, the seal portion 220 is formed into a soft and thick or uncompressed felt-like sheet of a low density as compared with the connecting portion 210 and the protecting portion 230. As shown in FIG. 2, a section of the seal portion 220 is tapered off from the protecting portion 230 toward the connecting portion 210 to form a fig-shape in cross section, which is thicker than other portions. The maximum thickness of the seal portion 220 is set to be larger than the distance between a flat holding portion 512 of the housing member 510 and an L-shaped holding portion 522 of a housing member 520. Preferably, the distance between the holding portions 512 and 522 is equal to the thickness of a flange portion plus the thickness of a gasket in the conventional filter element.

As described above, because a plurality of sheets of the filter material is formed into the flange portion 200, the density of the seal portion 220 is not lower than the density of the original filter material.

Thus, the filter element F having the above described structure is hermetically held between the two holding portions 512 and 522.

Because the seal portion 220 has the soft felt-like sheet which is thicker than the connecting portion 210 and the protecting portion 230, a sufficient seal can be provided between the seal portion 220 and the housing members 510 and 520 without using an extra member. Further, the seal member 220 is flexible and, therefore, the flange portion 200 is tightly and easily held between the holding portions 512 and 522.

As described above, because the connecting portion 210 and the protecting portion 230 are compressed to become solid, the soft seal portion 220 is protected from deforming force, and high strength of the filter element F is ensured. Because the seal portion 220 is formed into the felt-like wall having a density higher than the filter portion 100, a sufficient seal performance is ensured. The density of the seal portion 220 is lower than that of the connecting portion 210 and the protecting portion 230.

Further, as described above, because the seal portion 220 is formed to have the fig-shape in cross section, a portion of the seal portion 220 in contact with the holding portions of the two housing members 510 and 520 is located at the outer periphery of the filter element F. Thus, even if the position of the filter element F is shifted a little in the housing members 510 and 520 when assembled, a sufficient sealing performance is ensured.

As shown in FIGS. 2 and 3, intake air flows into the housing member 510 through the filter element F and the housing member 520 as indicated by arrows shown.

Here, a method for manufacturing the filter element F will be described.

Figure 4:
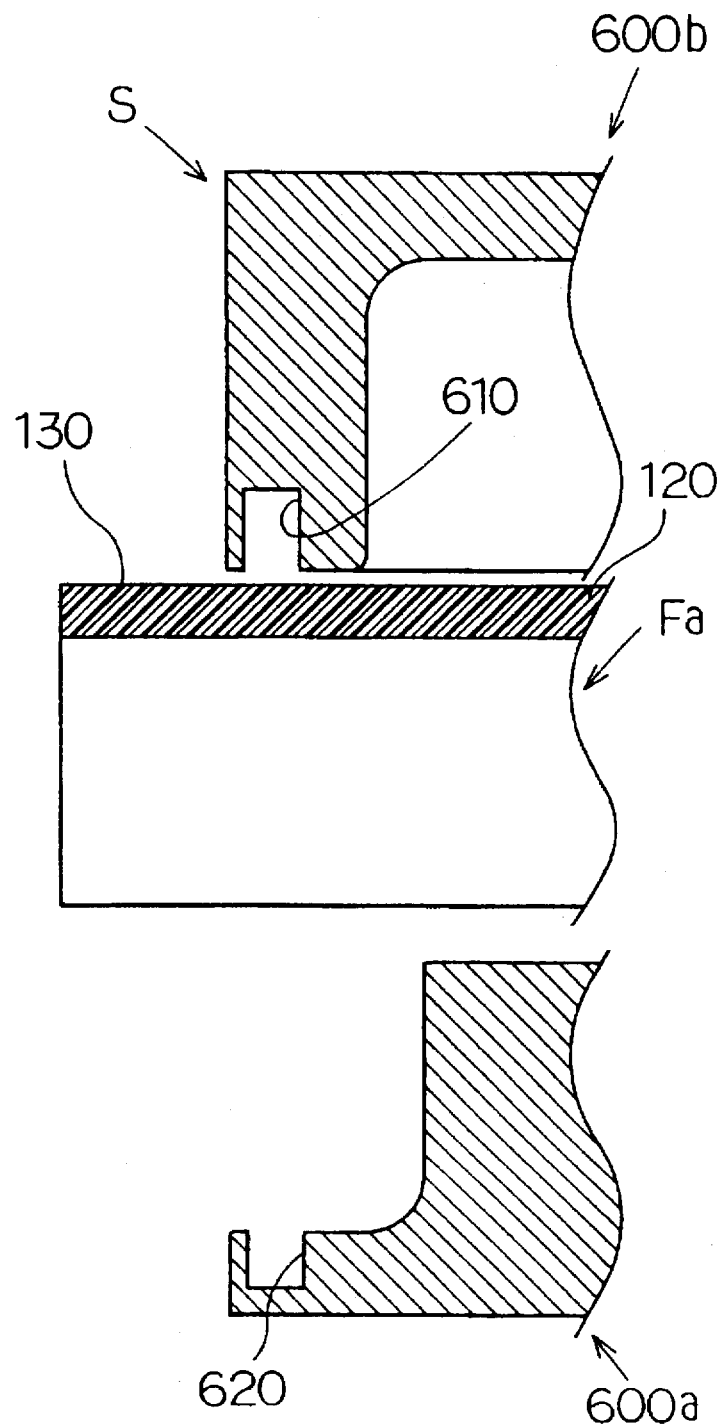
FIG. 4 is a partly enlarged sectional view showing a lower die and an upper die of a press-forming die for the filter element shown in FIG. 1.

First, as shown in FIG. 4, a forming die S composed of upper and lower dies 600a and 600b are provided. An intermediate filter material Fa, which is formed of laminated and pleated sheets of the above described filter material, is put between the upper and lower forming dies 600a and 600b. The opposite ends of the intermediate filter material Fa corresponds to the portions 200a and 200b shown in FIG. 1. They are folded or pleated to have a suitable thickness.

The peripheral portion 130 of the intermediate filter material Fa is pressed by the lower and upper dies 600a and 600b while the central portion 120 is left at it is. Therefore, as shown in FIG. 4, the lower die 600a has a central fork-shaped portion and a T-shaped cross section, and the upper die 600b has a central concave and nearly a U-shaped cross section.

Figure 5:
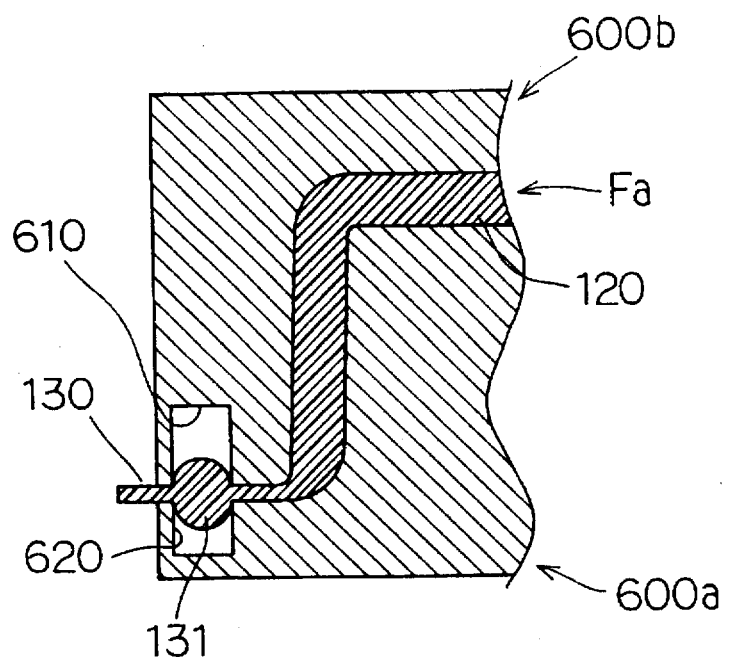
FIG. 5 is a partly enlarged sectional view showing the filter element shown in FIG. 1 being press-formed by the press-forming die shown in FIG. 4.

The upper die 600b is moved downward to the lower forming die 600a to press the outer periphery of the intermediate filter material Fa to form into a shape shown in FIG. 5. Thus, the opposite end portions 200a and 200b are formed as shown in FIGS. 2 and 3. At the same time, the opposite side portions 200c and 200d are formed after crushing the pleated sheet of the flange portions as shown in FIG. 1.

As shown in FIGS. 4 and 5, U-shaped circular recesses 610 and 620 are formed in the lower die 600a and the upper die 600b to provide a space at a position corresponding to the seal portion 220 during the press-forming step. Thus, a nearly a circular portion 131 corresponding to the seal portion 220 is formed as shown in FIG. 5.

Figure 6:
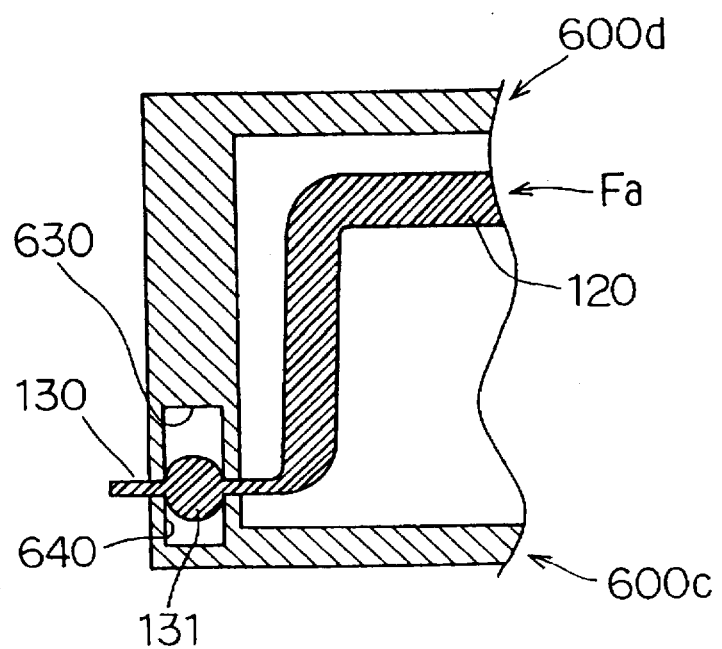
FIG. 6 is a partly enlarged sectional view showing the filter element shown in FIG. 1 being heated.

Next, the intermediate filter material Fa shown in FIG. 5 is put between upper and lower heating dies 600c and 600d as shown in FIG. 6. The heating dies 600c and 600d have circular recesses 630 and 640, which are similar to the circular recesses 610 and 620 of the lower and upper forming dies 600a and 600b.

When the intermediate filter material Fa is put between the upper and lower heating dies 600c and 600d with the circular portion 131 being inserted into the circular recesses 610 and 620 as shown in FIG. 6, the heating dies 600c and 600d heat the material Fa at a high temperature to soften, deform and harden the main fiber of the connecting portion 210 and the protecting portion 230. The circular seal portion 220 has upper and lower surfaces and is merged into the connecting portion 210 at one side and into the protecting portion 220 at the other side at obtuse angles with respect to the surfaces of the connecting portion 210 and the protecting portion 230. Therefore, the surface of the seal portion 220 is not heated while the connecting portion 210 and the protecting portion are heated, thereby preventing the seal portion from hardening.

Next, the circular portion 131 of the intermediate filter material Fa is formed into the fig-shape in cross section by a die as shown in FIG. 2.

Figure 7:
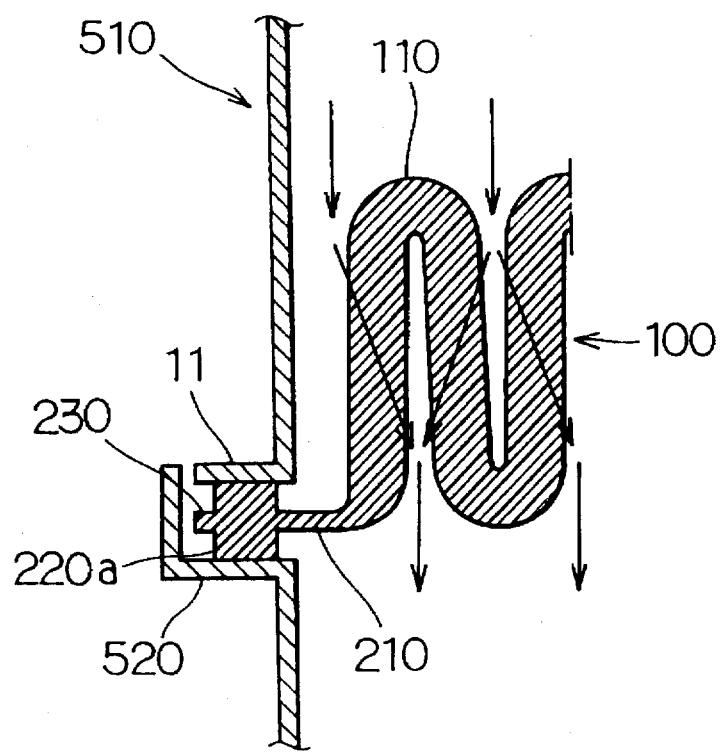
FIG. 7 is a partly enlarged sectional view showing a cross-sectional variation of the filter element according to the first embodiment.
Figure 8:
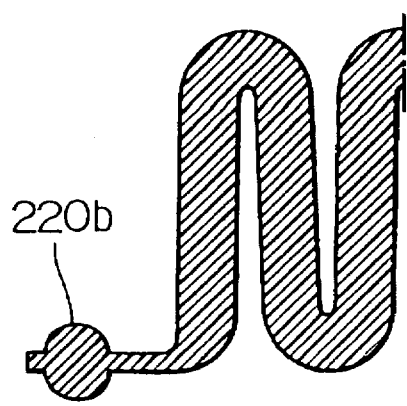
FIG. 8 is a partly enlarged sectional view showing another cross-sectional variation of the filter element according to the first embodiment.
Figure 9:
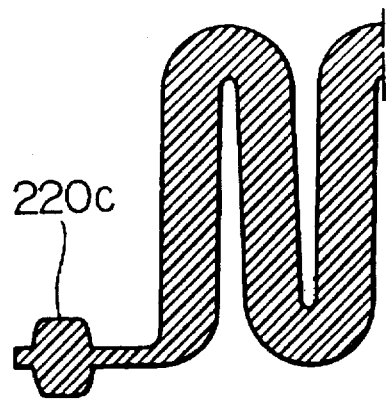
FIG. 9 is a partly enlarged sectional view showing another cross-sectional variation of the filter element according to the first embodiment.

The seal portion having the fig-shaped cross-section may be replaced with a rectangular shape 220a as shown in FIG. 7, a cylindrical portion 220b or 220c as shown in FIG. 8 or FIG. 9. The seal portions 220a, 220b and 220c shown in FIGS. 7 through 9 have cross-sections symmetrical with respect to a plane including the connecting portion 210. However, the seal portion 200 can be formed asymmetrical. It can be formed into any other shape in combination of two of the shapes of the seal portions 220a, 220b and 220c. For example, a half of the circular seal portion 220b and a half of the square portion 220a can be combined with each other.

Figure 10:
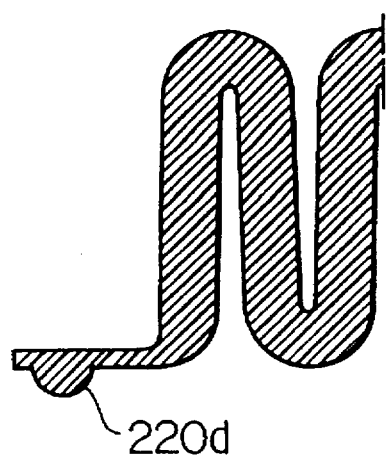
FIG. 10 is a partly enlarged sectional view showing another cross-sectional variation of the filter element according to the first embodiment.

Further, the seal portion 220 may be formed to have a semicircular cross section. The semicircular portion 220d shown in FIG. 10 faces the clean-side housing member 520 to prevent dust from flowing into the inside of the housing member 520.

Figure 11:
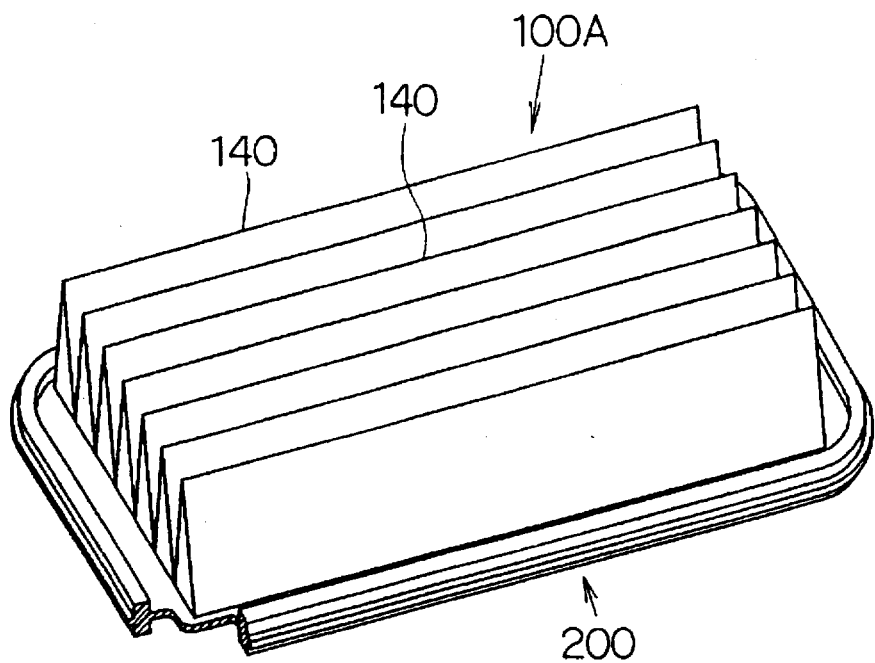
FIG. 11 is a perspective view showing a structural variation of the filter element according to the first embodiment.

Here, a first structural variation of the first embodiment will be described with reference to FIG. 11.

A filter portion 100A is formed of a plurality of pleated portions 140 which is disposed perpendicular to those of the filter portion 100 in FIG. 1. The other structures are similar to that of the filter portion 100 of the first embodiment.

Figure 12:
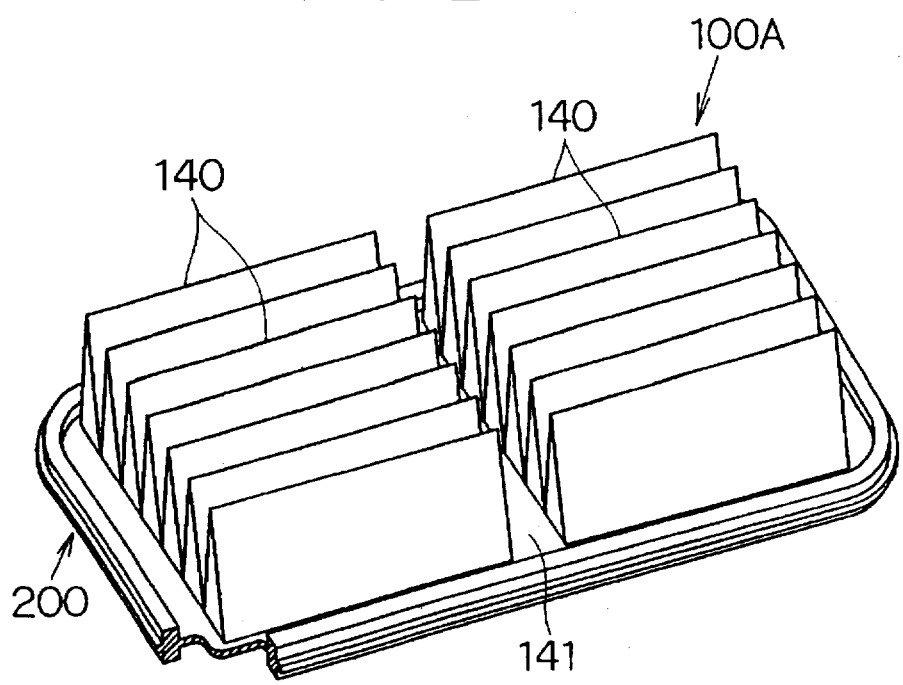
FIG. 12 is a perspective view showing another structural variation of the filter element according to the first embodiment.

The filter element can be formed as shown in FIG. 12, in which the center portions in the longitudinal direction of each the pleated portion 140 of the filter portion 100A are pressed by heating so that a bridge portion 141 similar to the connecting portion 110 is formed.

The bridge portion 141 prevents the two longer side portions 200c and 200d of the filter element from bending toward the inside. The other structures and the operation effects are similar to that of the above described first modification of the first embodiment.

Figure 13:
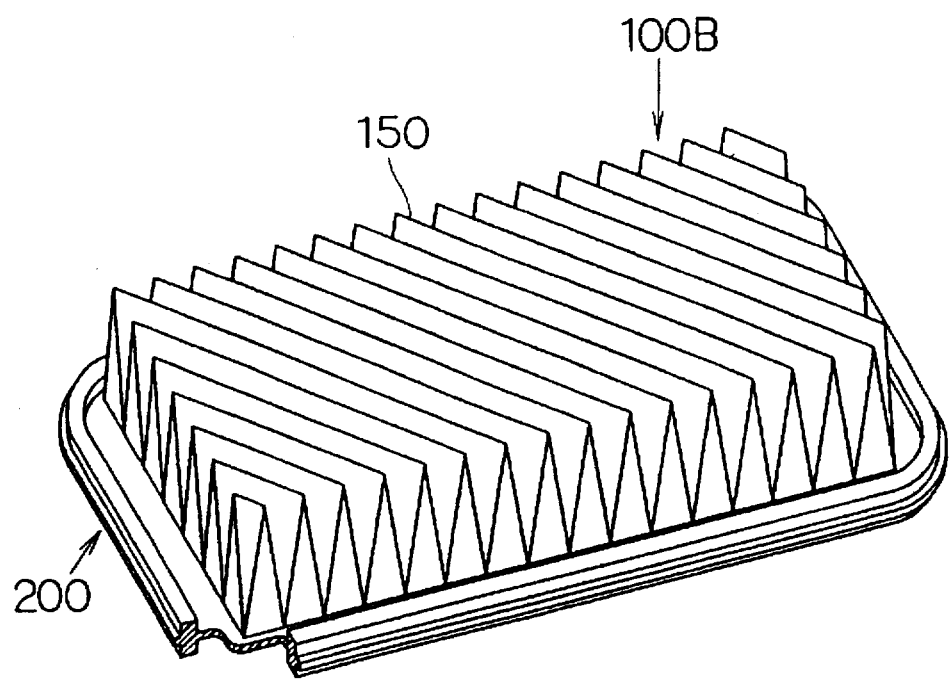
FIG. 13 is a perspective view showing another structural variation of the filter element according to the first embodiment.

Further, a second structural variation of the first embodiment will be described with reference to FIG. 13.

A plurality of the pleated portions 150 is disposed in a direction crossing the flange portion 200 at an angle 45° so that whole flange portion 200 is formed by pressing to crush the top and the bottom of each the pleated portion 150. As a result, the flange portion 200 has an uniform density and strength. Other structures, operation and effects are similar to the first embodiment.

Figure 14:
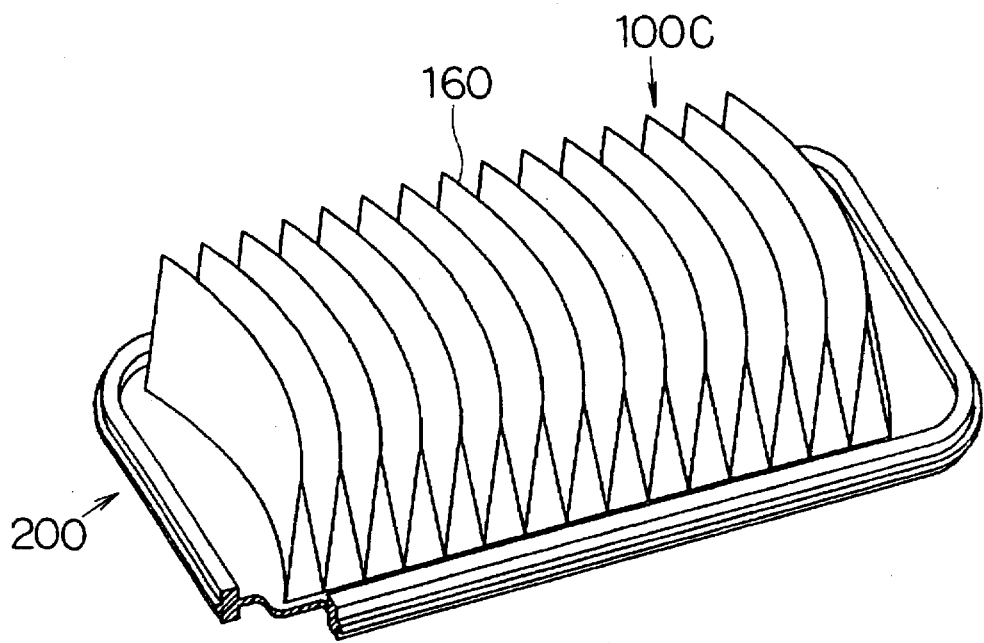
FIG. 14 is a perspective view showing another structural variation of the filter element according to the first embodiment.

A third structural variation of the first embodiment will be described with reference to FIG. 14.

A plurality of arch-shaped pleated portions 160 is formed to increase the stiffness of the entire filter portion 100C. The other structure, operation and effects are similar to those of the above described first embodiment.

Further, a fourth structural variation of the first embodiment will be described with reference to FIG. 15.

Figure 15:
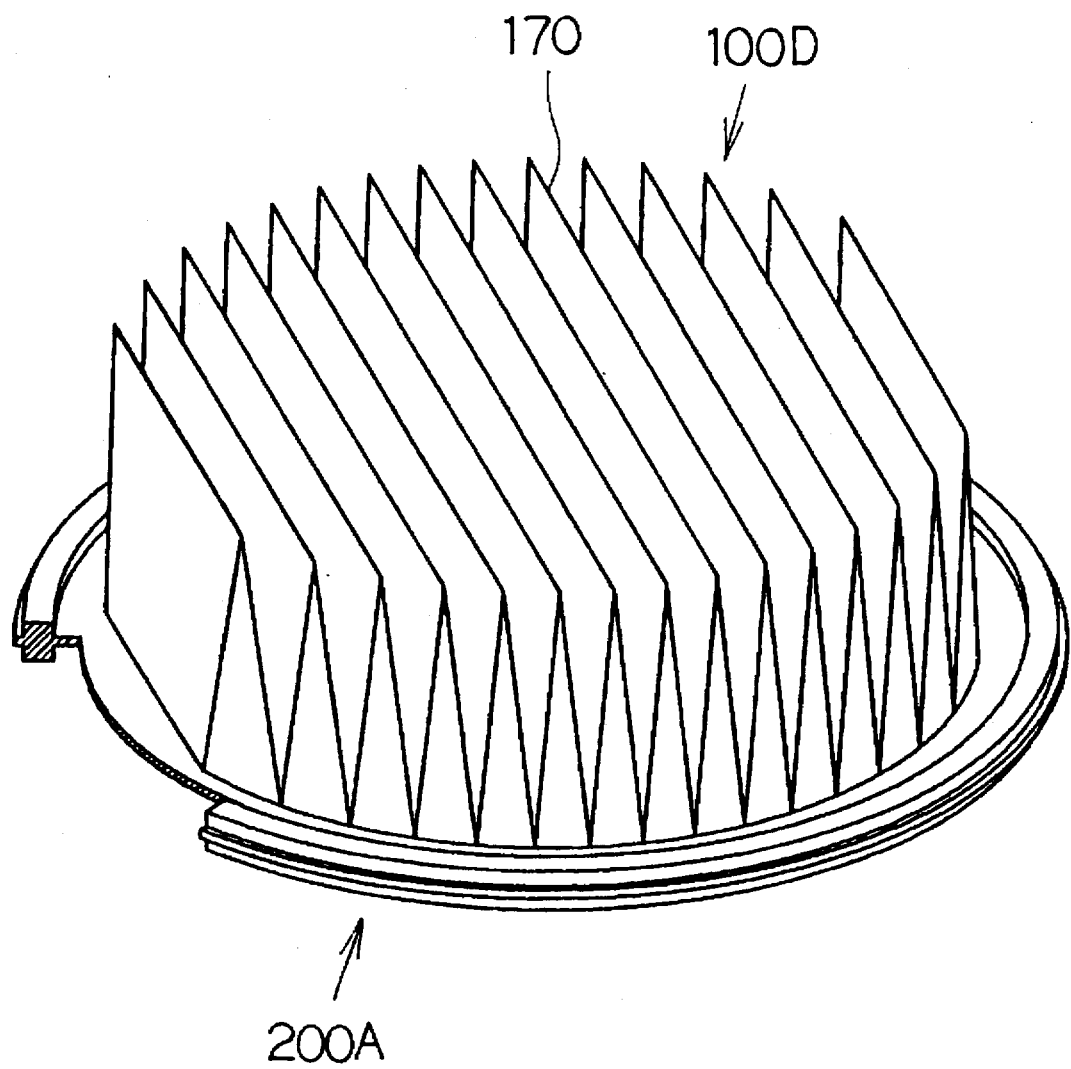
FIG. 15 is a perspective view showing another structural variation of the filter element according to the first embodiment.

As shown in FIG. 15, the periphery of the filter portion 100D and the flange portion 200A are formed to be circular. The operation and effects similar to those of the first embodiment can be achieved.

The periphery of the pleated portion 170 may be formed to be circular, radial, curled, triangular or polygonal.

Figure 16:
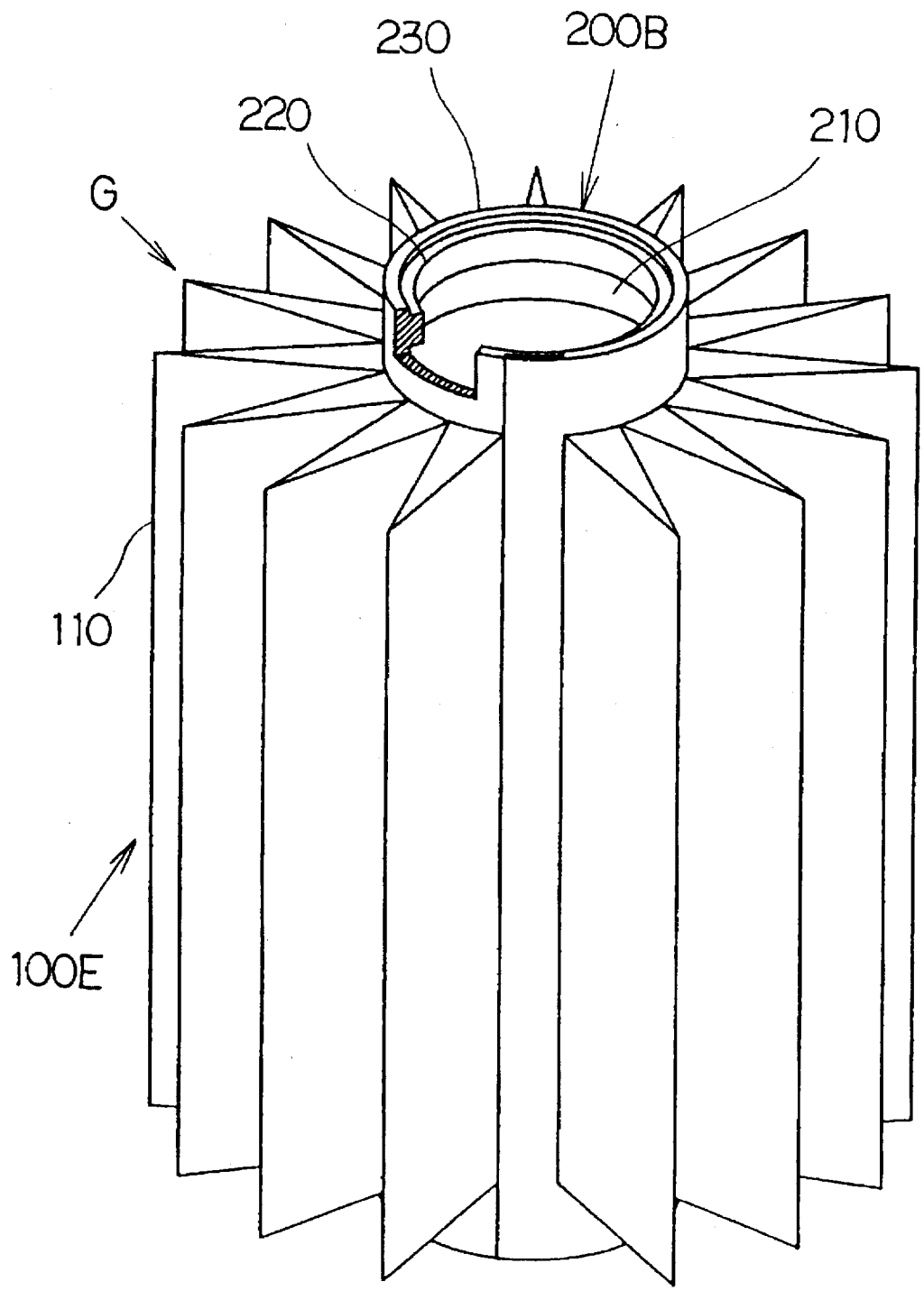
FIG. 16 is a perspective view showing another structural variation of the filter element according to the first embodiment.
Figure 17:
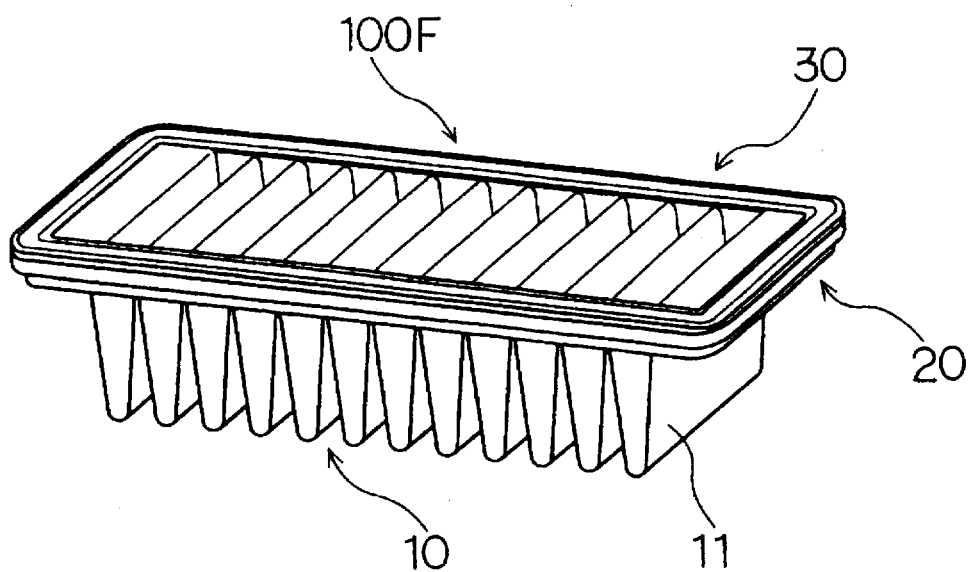
FIG. 17 is a perspective view showing a filter element according to a second embodiment of the present invention.
Figure 18:
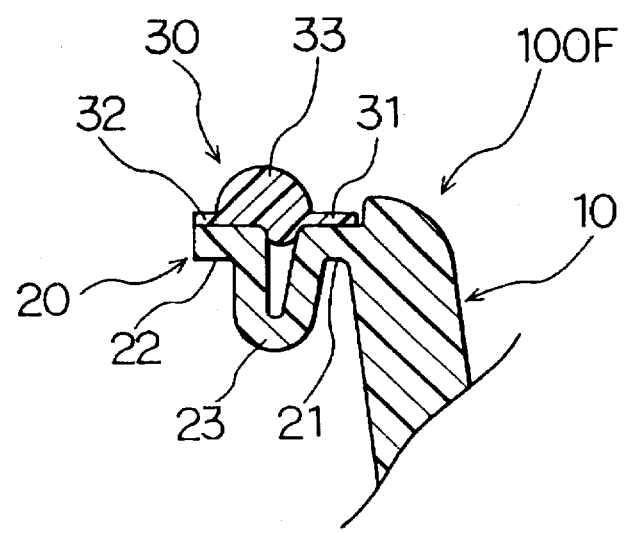
FIG. 18 is a sectional view showing a flange portion and a seal member of the filter element according to the second embodiment.

A fifth structural variation of the first embodiment will be described with reference to FIG. 16.

A filter element G is composed of a filter portion 100E and flange portion 200B. A straight filter portion such as shown in FIG. 1 is rolled in a cylindrical shape and the opposite ends of the filter portion are overlapped and heated to connect with each other. The flange portion 200B has a seal portion 220 and a protecting portion 230, which are formed in a manner similar to the embodiment described previously.

When outside air is taken in to the circumference (that is, dusty-side) of the filter portion 100E from an inlet of the housing, the air passes through the filter portion 100E and enter the inside (that is, the clean-side) of the filter portion 100E. Thereafter, the filtered air flows out of the flange portion 200B, and an outlet of the housing. The inlet of the housing is sealed by a seal portion 220 of the flange portion 200B.

The seal portion having a fig-shape cross section as described with respect to the first embodiment can be replaced easily.

The flange portion 200B may extend from the longitudinal center of the pleated filter portion 100E.

A second embodiment of the present invention will be described with reference to FIGS. 17 to 24.

A filter element 100F includes a filter portion 10 composed of a plurality of pleated portion 11, a flange portion 20 framing and supporting the filter portion 10 and a seal member 30 bonded onto the flange portion 20. The flange portion 20 is formed to be integral with a filter portion 10 and is composed of a flat connecting portion 21, a flat protecting portion 22 and a lip portion 23 having a V-shaped cross-section extending backward of the seal member 30 which gives a sufficient stiffness. Accordingly, the lip portion 23 is much harder than the seal portion 30. The flange portion 20 is heated and pressed so that the flange portion 20 is fully hardened as described before. The seal member 30 has a seal portion 33 and is bonded to the flange portion 20 by hot-melting an inner flat portion 31 and an outer flat portion 32.

The seal member 30 is made of the same nonwoven fabric as the main fiber of the filter portion 10 and flange 20. The seal member 30 is made by only the main fiber without adhesive fiber. The flat connecting portions 21 and the flat protecting portion 22 of flange portion 20 and the inner and outer flat portions 31 and 32 of the seal member 30 are heated and pressed by hot plates from outside to bond the flange portion 20 and the seal member 30. Preferably, the filter materials of the nonwoven fabric composed of main fiber and adhesive fiber are made by the same polyester fiber. Further, in the second embodiment, the lip portion 23 can have any sectional shape as far as it functions as a seal member.

Figure 19:
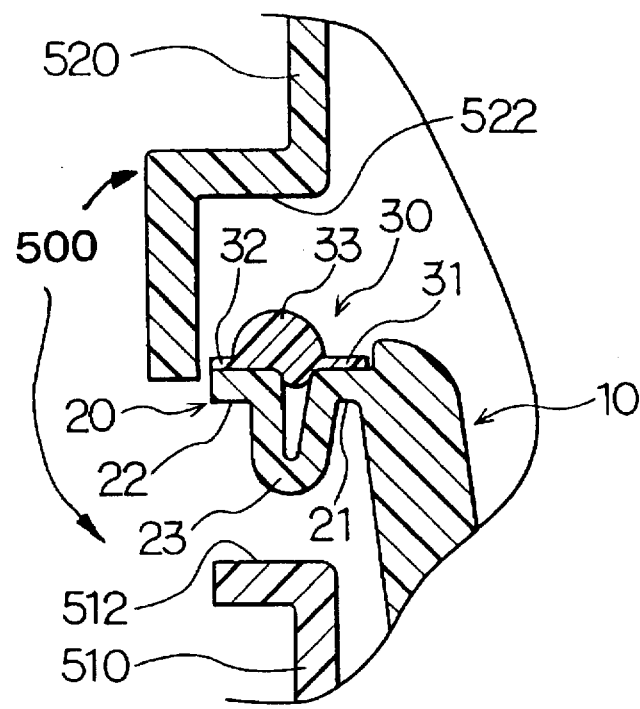
FIG. 19 is a sectional view showing the filter element according to the second embodiment before being installed into a housing.
Figure 20:
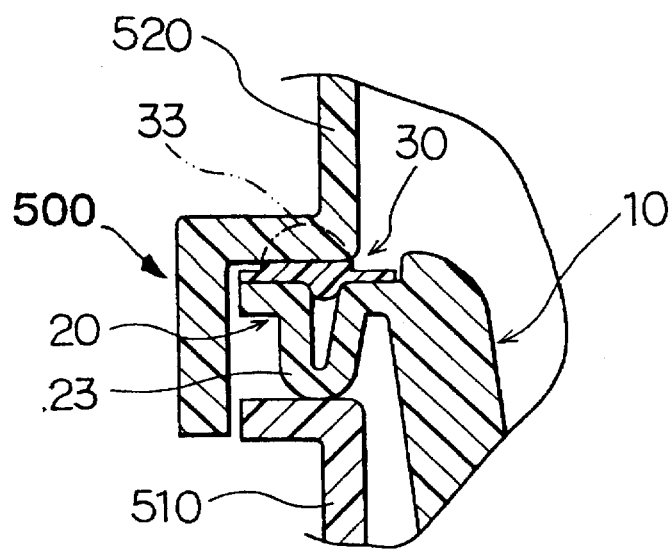
FIG. 20 is a sectional view showing the filter element of the second embodiment being installed into the housing.

In FIGS. 19 and 20, the flange portion 20 is held and fixed between a holding portion 512 of a case 510 (dusty-side housing) and a holding portion 522 of a cap 520 (clean-side housing) so that the filter element 100F is held into the housing. The hardness of the lip portion 23 is sufficient to maintain the peripheral shape and, therefore, the lip portion 23 is protected from a deforming force when the filter element 100F is assembled into the air cleaner 500.

The seal portion 33 of the seal member 30 is described next.

Figure 21A:
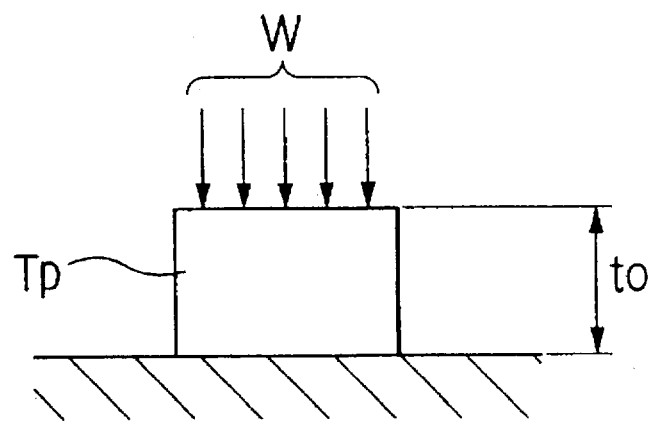
FIGS. 21A, 21B and 21C are diagrammatic views explaining a process of an endurance test of a piece of an nonwoven fabric forming the seal member of the filter element according to the second embodiment.
Figure 21B:
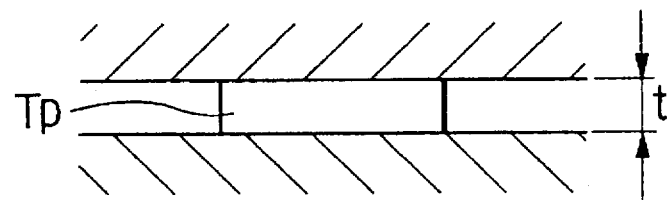
Figure 21C:
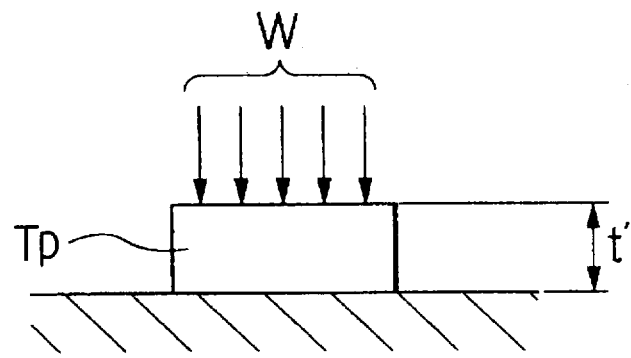

As shown in FIGS. 21A, 21B and 21C, if an original height of a nonwoven fabric piece Tp when a load W is applied to the same is $t^o$, and a height of the nonwoven fabric piece Tp when the same is pressed to a specified size is t, and a height of the fabric piece Tp when the load W is applied to the same thereafter is $t^{o\prime}$, the compressibility α of the seal member 30 is calculated by following equation (1).

$$\alpha [\%] = \{(t^o-t)/t^o\} \times 100 \quad (1)$$

The permanent-compression-strain-percentage CS is calculated by following equation (2).

$$CS[\%] = \{(t^o-t^{o\prime})/(t^o-t)\} \times 100 \quad (2)$$

Figure 22:
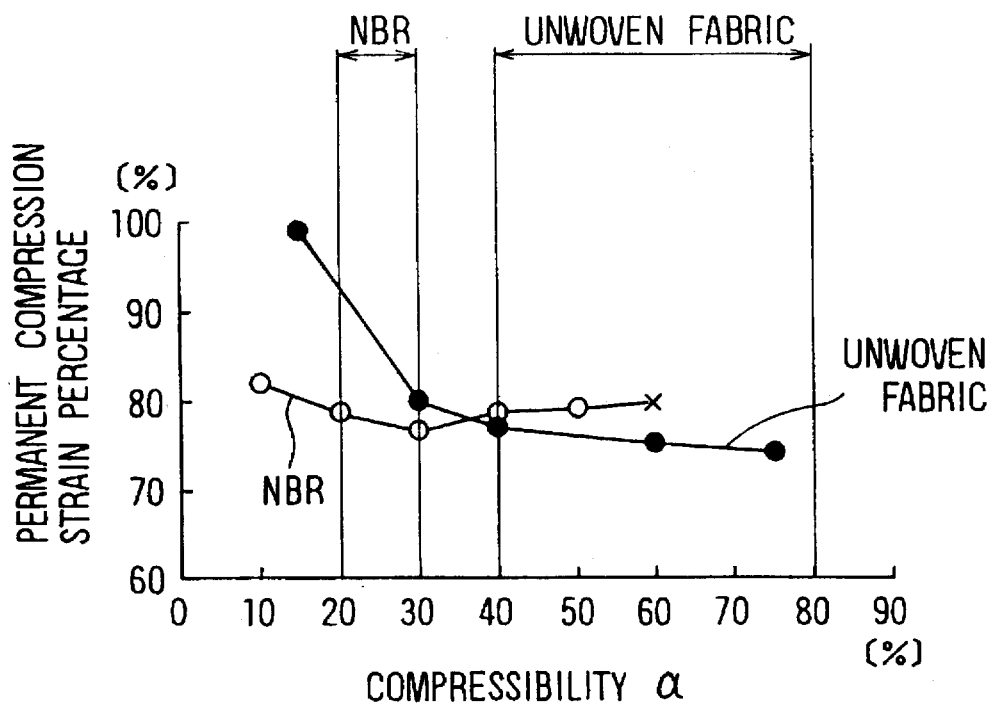
FIG. 22 is a graph showing the result of the press endurance test of FIGS. 21A, 21B and 21C.

FIG. 22 shows a relationship between a suitable area of the compressibility α[%] and the permanent-compression-strain-percentage CS[%] of the nonwoven fabric shown in FIGS. 21A, 21B and 21C is considered.

As shown in FIG. 22, the suitable area of the compressibility α of the nonwoven fabric is in a range of 40~80% when the permanent-compression-strain-percentage CS is about 75%. With the NBR (nitrile rubber), which is shown as a comparative material, the suitable area of the compressibility α is in a range of 20~30% (narrower than the range of the nonwoven fabric). If the compressibility α of the NBR becomes more than 60% a crack may be generated as shown by a cross mark in FIG. 22.

The lip portion 23 of the filter element 100F forms a wall surrounding the entire periphery of the flange portion 20. Therefore, when the filter element 100F is assembled into an air cleaner, the lip portion 23 is held between the holding portion 512 of the case 510 and the holding portion 522 of the cap 520.

Further, because the lip portion 23 of the filter element 100F has the V-shaped cross section, width of the flange portion 20 can be made small and the effective area of the filter portion 10 can be made wide.

A first cross-sectional variation of the second embodiment will be described with reference to FIGS. 23 and 24.

Figure 23:
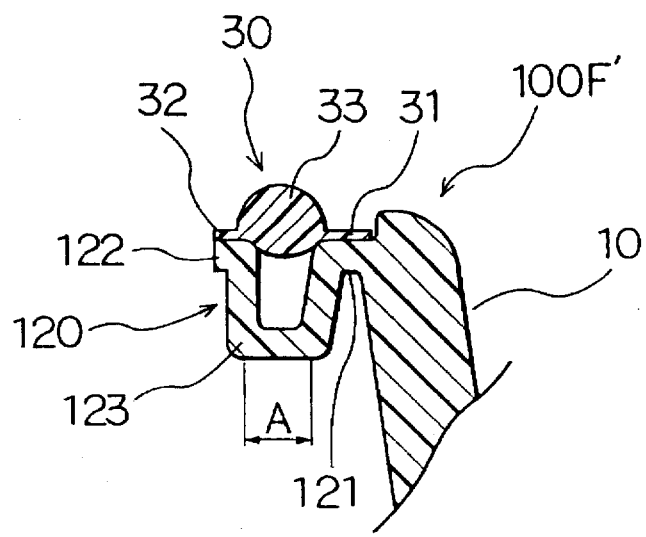
FIG. 23 is a sectional view showing a sectional variation of the flange portion of the filter element according to the second embodiment.
Figure 24:
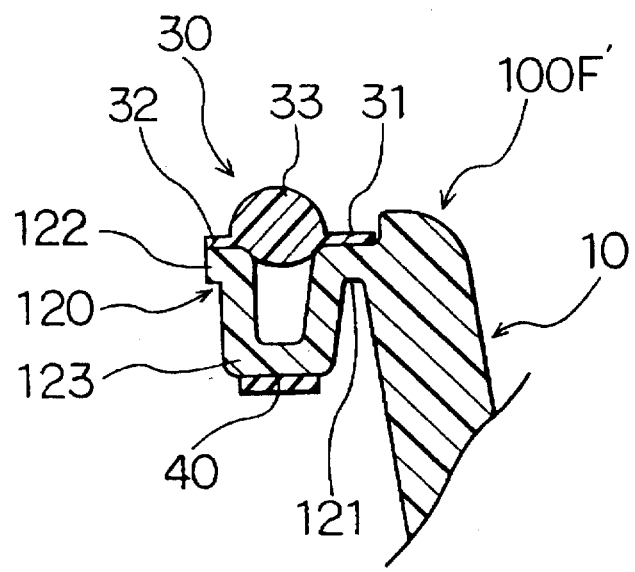
FIG. 24 is a sectional view showing another sectional variation of the filter element according to the second embodiment.

As shown in FIG. 23, because a lip portion 123 of a flange portion 120 is provided with a flat bottom having a width A to form a trapezoidal shape, noise generated in the air cleaner (not shown) is prevented from being transmitted to the outside. The noise transmission is also prevented by a seal member 30 which is bonded to the lip portion 123 at the dusty side as shown in FIG. 24.

A second cross-sectional variation of the second embodiment is described with reference to FIGS. 25 and 26.

Figure 25:
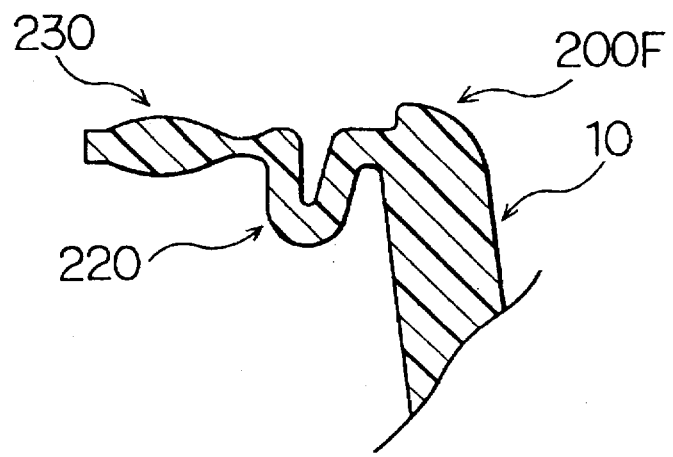
FIG. 25 is a sectional view showing another sectional variation of a flange portion of a filter element according to the second embodiment.
Figure 26:
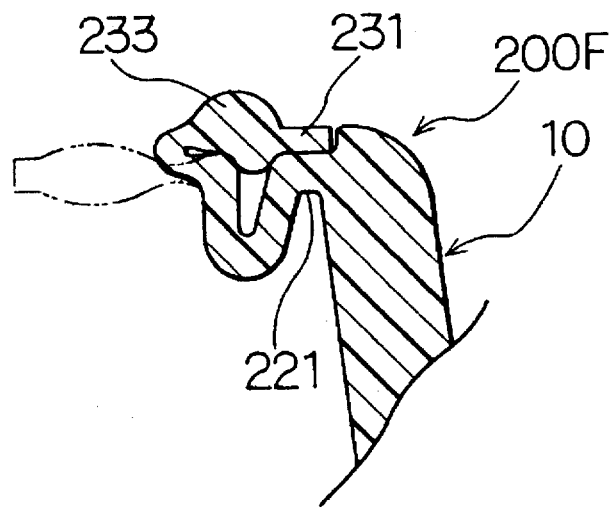
FIG. 26 is a sectional view showing the flange portion of the filter element shown in FIG. 25 when the flange portion is in use.

As shown in FIG. 25, a seal member 230 which has a convex-lens-shaped cross-section is formed at the outer periphery of the flange portion 220. The seal member 230 is bent to be put on the open side of the lip portion so that a flat portion 231 of the seal member 230 is heated and bonded to a flat connecting portion 221 of the flange portion 220. A soft seal portion 233 having a low density is formed in the seal member 230 integrated with the flange portion 220.

As described above, in the second modification of the second embodiment, the seal member 230 is formed integrally with the flange portion 220, and the seal member 230 is bent so that the above described seal performance is obtained. Further, the flange portion 220 is integrated with the filter portion 10. Thus, the part number of the filter element is decreased so that the structure of the filter element can be made simple.

Figure 27:
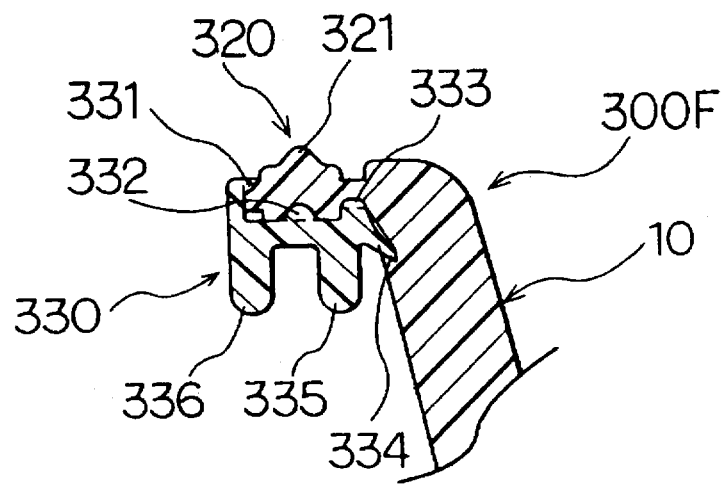
FIG. 27 is a sectional view showing another sectional variation of the filter element according to the second embodiment.
Figure 28:
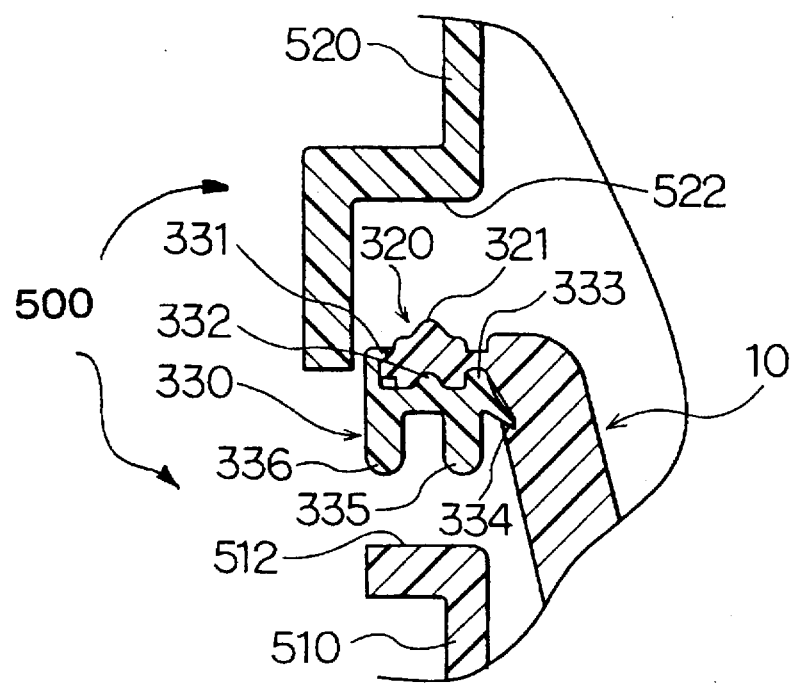
FIG. 28 is a sectional view showing the flange portion shown in FIG. 27 in assembling.
Figure 29:
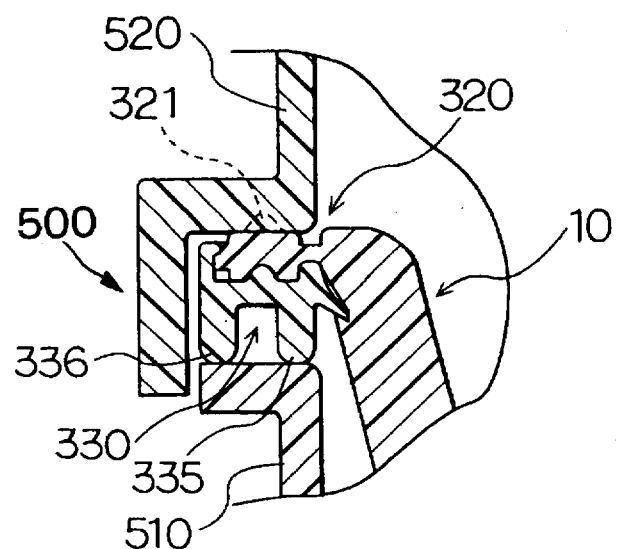
FIG. 29 is a sectional view showing the flange portion shown in FIG. 27 after assembling.

A third cross-sectional variation of the second embodiment of the present invention will be described with reference to FIGS. 27–29.

A flange portion 320 is formed integrally with the outer periphery of the filter portion 10 of the filter element 300F, a soft and uncompressed seal portion 321 is formed on the center of the flange portion 320 at the clean side. On the other hand, a separate frame member 330 is fixed to the flange portion 320 at the dusty side. The frame member 330 has four projecting portions 331,332, 333 and 334 engaging the flange portion 320 and two projecting portion 335 and 336. The outermost projecting portion 331 engages the outer periphery of the flange portion 320. The projecting portion 332 is tightly pressed into the back of the seal portion 321. The projecting portion 333 is pressed into the inner connecting portion of the flange portion 320 to engage the filter element 300F. The projecting portion 334 has a sharp edge, which is wedged into the side surface of the filter portion 10.

The flange portion 320 and the frame 330 are held between the holding portion 512 of the case 510 and the holding portion 522 of the cap 520 of the air cleaner 500 when the filter element 300F is assembled into an air cleaner. The frame 330 is made of a resin hard enough to prevent deformation when the filter element 300F is assembled. For this purpose, the seal portion 321 of the flange 320 is press-formed at a suitable pressure.

As described with reference to FIGS. 17 to 29, at least one of the seal portion and the lip portion is made of the same material as the filter portion 10. As a result, the number of parts and materials are reduced, and the manufacturing process is simplified.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A filter element to be installed in a housing having a dusty-side holding member and a clean-side holding member, said filter element being made of compressible nonwoven fabric and comprising:
    a pleated filter portion; and
    a flange portion integrally connected with said filter portion's outer periphery for supporting said filter portion, said flange portion including:
        a soft and thick compressible seal portion to be disposed between said dusty-side and clean-side holding members when said filter element is installed in said housing,
        a thin compressed connecting portion disposed integrally between said seal portion and said filter portion, and
        a thin compressed protecting portion disposed integrally around said seal portion for protecting said seal portion from deforming forces.

2. A filter element according to claim 1, wherein, said nonwoven fabric includes adhesive fiber.

3. A filter element according to claim 1, wherein
    said seal portion has a convex surface.

4. A filter element according to claim 1, wherein
    said seal portion has a fig-shaped cross section.

5. A filter element according to claim 1, wherein said filter element has a rectangular pleated filter portion having a plurality of pleats disposed in parallel with one another.

6. A filter element to be installed in a housing having a dusty-side holding member and a clean-side holding member comprising:
    a filter portion including a plurality of pleated portions; and
    a flange portion integral with an outer periphery of said filter portion for insertion in a space between said dusty-side holding member and clean-side holding member when said filter element is installed in said housing;
    said flange portion including:
        a thick compressible seal portion projecting in a first direction to seal said space, and
        a hard lip portion projecting in a second direction opposite to said seal portion to seal said space and support said seal portion,
    at least one of said seal and lip portions being integral with said outer periphery of said filter portion.

7. A filter element according to claim 6, wherein
    said seal portion is bonded to said flange portion.

8. A filter element according to claim 6, wherein said seal portion is connected integrally with said lip portion's outer periphery, said seal portion being bent against said lip portion.

9. A filter element according to claim 8, wherein
    said seal portion is bonded to said flange portion.

10. A filter element according to claim 6, wherein said lip portion has a V-shaped cross section.

11. A filter element according to claim 6, wherein said lip portion has a trapezoidal cross section.

12. A filter element according to claim 6, wherein
    said lip portion has a compressibility of more than about 40%.

13. A filter element to be installed in a housing having a dusty-side holding member and a clean-side holding member comprising:
    a filter portion made of nonwoven fabric and including a plurality of pleated portions;
    a flange portion made of the same nonwoven fabric from which said filter portion is made, said flange portion being disposed integrally around said filter portion for supporting said filter portion; and
    a separate lip portion being harder then said flange portion and bonded to said flange portion to cover the outer periphery of said flange,
    said flange portion having an integral seal portion to be inserted between said dusty-side and clean-side holding members together with said lip portion when said filter element is installed in said housing.

14. A filter element according to claim 13, wherein said seal portion is bonded to said lip portion.

* * * * *